United States Patent Office

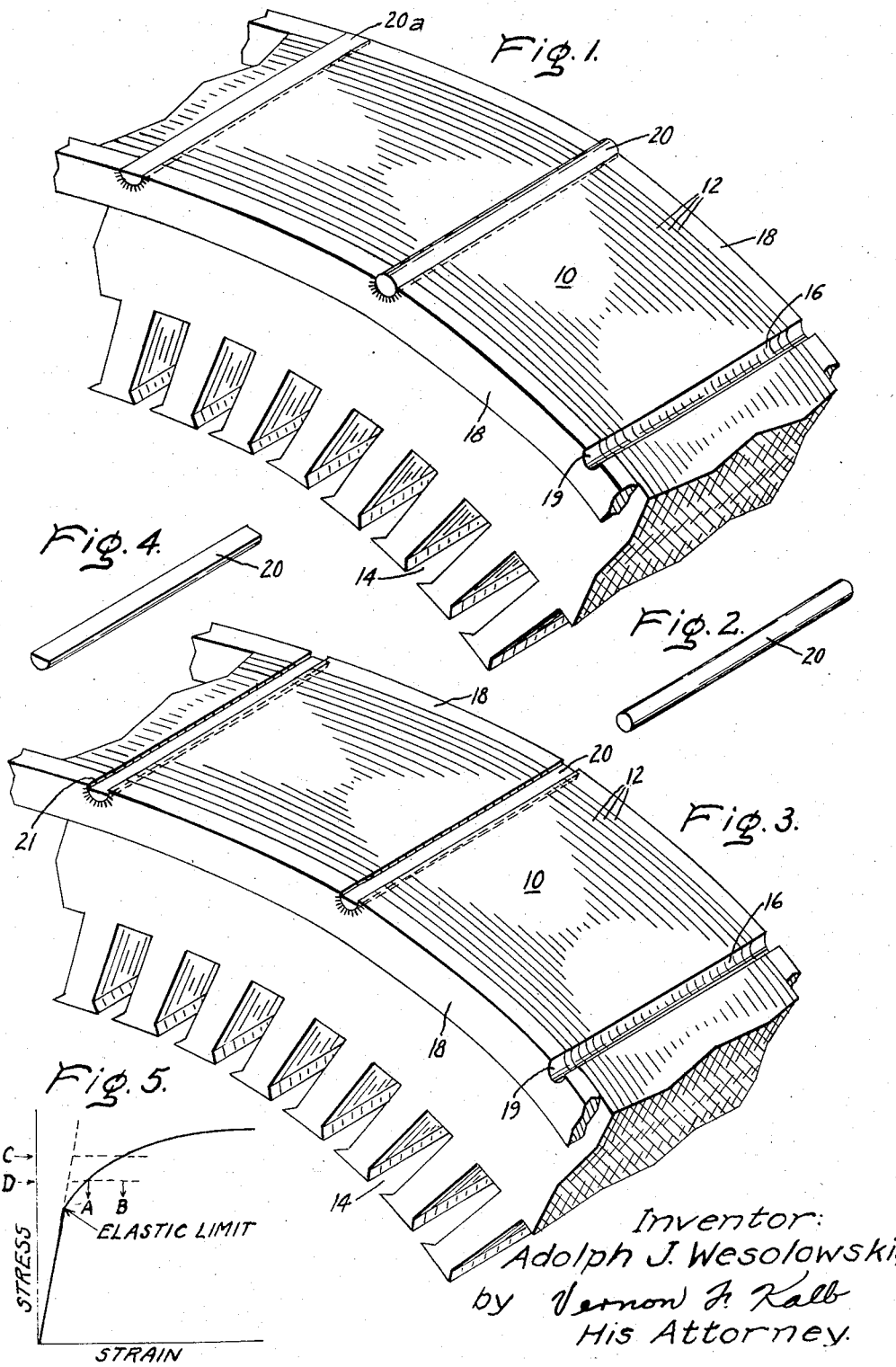

2,876,371
Patented Mar. 3, 1959

2,876,371

CORE CONSTRUCTION FOR ELECTRICAL EQUIPMENT

Adolph John Wesolowski, Erie, Pa., assignor to General Electric Company, a corporation of New York Application March 25, 1957, Serial 648,341

6 Claims. (Cl. 310—217)

The present invention relates generally to electrical equipment, and more particularly to a novel construction for holding together the sheet-like punchings or laminations employed as magnetic cores in such equipment.

At the present time, most of the electrical equipment utilizing laminated cores have the laminations held together by means of rivets, welds, or cements such as epoxy resins. As is well known to those familiar in the art, the use of rivets results in relatively high eddy current losses due to the fact that the rivets are, of necessity, located in the flux path at a position where the flux density is relatively high and, in addition, when the ends of the rivets are upset, the laminations are pressed together more tightly than is desirable to decrease the insulating effect of the film of varnish, oxide or scale on the surface of the laminations to decrease the effectiveness of the surface treatment and thereby increase flux losses.

Welded constructions, while satisfactory for many applications, require an annealing operation after the welding to relieve stresses. The annealing operation causes additional oxidation of the surfaces of the laminations to increase the magnetic reluctance of the flux path provided by the core, making this method of holding the laminations together less than fully satisfactory in applications where low weight and high performance are required, such as in aircraft generators.

Cemented core constructions are also quite useful in many applications. However, the added thickness of the cement between the laminations requires the core to be longer for the same effective flux capacity. Further, a cemented construction is physically weaker than other constructions, and will not operate at high temperatures due to the temperature limitations of the cement.

It is an object of the present invention, therefore, to provide a novel construction for holding the laminated cores together which will reduce eddy current losses below those found in riveted constructions.

Another object of this invention is to provide a laminated core construction having a controlled compressive force applied to the laminations to obtain the optimum balance between flux carrying capacity and flux losses.

A further object of this invention is to provide a method of manufacturing laminated magnetic cores wherein the compressive force applied to hold the laminations together is uniform and consistent from one core to another.

Further objects and advantages of the present invention will become apparent and this invention will be better understood from the following description, reference being made to the accompanying drawing. The features of novelty which characterize the invention are set forth in the claims annexed to and forming part of this specification.

In the drawing,

Fig. 1 is a fragmentary perspective view of a stator of a dynamoelectric machine embodying the teachings of the present invention showing one of the stator clamping pins removed;

Fig. 2 is a stator clamping pin which may be utilized in the practice of this invention;

Fig. 3 is a fragmentary perspective view, similar to Fig. 1, of a modified form of my invention; and Fig. 4 is a clamping pin utilized in modified form shown in Fig. 3.

Fig. 5 is a stress-strain curve of a material suitable for making the clamping pins and which will be used to explain the invention.

In accordance with one aspect of my invention, a pair of end rings is placed at the ends of a stack of laminations forming a magnetic core. A plurality of pins have their ends welded to the clamping rings alone. By welding the pins to the clamping rings while the clamping rings are under a compressive force, the resilience of the laminations expands the core to stretch the pins beyond their elastic limit thereby to produce a substantially uniform force on the laminations regardless of manufacturing variations or the initial compressive force applied during the welding operation.

By way of illustration, the invention is shown and will be described as being applied to the stator of a dynamoelectric machine. It is understood, however, that the principles of the invention may be applied to the rotors of dynamoelectric machines, the cores of transformers and like equipment.

Referring now to the drawing, and more particularly by reference numerals, 10 indicates generally the stator of the dynamoelectric machine embodying the teachings of the present invention. The stator comprises a plurality of stacked magnetic steel punchings for laminations 12 of a configuration shown in Fig. 1 which are disposed one on top of the other to form a short hollow column of the desired length. Each face of each lamination 12 is normally covered by a surface treatment, such as a varnish or oxide, to form an insulation barrier between adjacent laminations for reducing eddy current losses caused by stray currents passing from one lamination to another.

The inner edges of the laminations 12 contain aligned slots 14 for the insertion of conductors (not shown).

In the preferred embodiment, the outer periphery of the laminations 12 is provided with a plurality of spaced grooves 16 shown as being of semicircular cross section. Positioned at each end of the stack of laminations 12 are end rings 18 having cooperating grooves 19 which are aligned with grooves 16. A predetermined number of pins 20 of generally cylindrical cross section are positioned in the aligned grooves 16 and 19 and are connected to the ends of the core as by being welded only to the end rings 18. In a completed core 10, the pins 20 which are made of a material such as ductile iron, transmit a compressive force between the end rings to apply a uniform and predetermined pressure to secure the laminations 12 together.

This invention contemplates that each of the pins 20 of a completed core 10 will be stressed beyond its elastic limit so that the stress applied to the laminations is determined by the flat portion of the stress-strain curve of the material used in the pins 20, so that deviations in the clamping pressure applied will not produce variations in pressures applied by the pins 20 at different points around the periphery of a single core, or from one core to another. Referring to Fig. 5, which is a typical stress-strain curve for a material suitable for use in making pins 20, it will be observed that an increase in stress will result in a proportional increase in strain until the elastic limit of the material is exceeded. Thereafter the strain will increase disproportionately to the stress applied and a permanent set or elongation of the material will take place. Thus, if the clamping pressure during the welding operation exceeds the elastic limit of the pins 20, or is a value of, say, A on Fig. 5, any large variation in the clamping pressure to a value of, say, B will have very little effect on the compressive force applied to the laminations 12 of a completed core 10. Thus the elastic limit of the material from which pins 20 are made, together with their total cross-section, will fix the compressive force exerted on the laminations 12 of a completed core 10.

In producing a core embodying this invention, the stack of laminations 12 and their end rings 18 are clamped, during the welding operation, under a predetermined pressure sufficient to cause the pins 20 to stretch beyond their elastic limit upon the release of the clamping pressure. The pins 20 are welded to the end rings 18 and the pressure is then released to permit the expansion of the laminations to stretch or tension pins 20. Since the pins 20, when stressed beyond their elastic limits, have a permanent set or elongation, a predetermined compressive force of high uniformity is achieved. After the welding operation, no annealing process is necessary since there has not been a direct application of heat to distort a portion of each lamination.

It is preferable that the pins 20 extend above the peripheral surface of the laminations so that the outer periphery of the core may be ground to produce a smooth surface in which only a portion, say, one-half of each pin 20 remains as is shown at 20a in Fig. 1. This provides a further control on the compressive force applied to a finished core to obtain a compressive force sufficient to prevent relative movement of one lamination with respect to another in a circumferential direction and low enough not to interfere with the insulating properties of the surface treatment of the laminations. Such compressive forces may easily be determined for any given magnetic core.

The following is an illustration of the method of making magnetic stator cores according to my invention which has been successfully used. Cylindrical laminations having an outer diameter of 10 inches and an inner diameter of 8 inches were placed between end rings in a press. Twelve 1/16 inch diameter pins were then laid in the grooves in the surface of the laminations. The pins were welded to the end rings while a force of 20 tons was applied by the press. After release of the external forces applied by the press and grinding the outer surface of the core so that only ½ the pins 20 remained, the pins were strained beyond their elastic limits to produce a uniform compressive force holding the laminations together. The magnetic cores were tested and were found to have approximately 25% less core losses than standard welded cores and requiring 20% less excitation current than such welded cores. In addition, the core losses and excitation current required of a large sample of such cores were consistent with each other within 10%, whereas in standard welded core constructions, these variations were ±400%.

While the foregoing is the preferred method of manufacturing magnetic cores in accordance with my invention, it is apparent that any other method of stressing the pins 20 by proper amount in the finished product could be utilized. For example, pins 20 could be heated initially at the time of welding so that upon cooling down, the stress applied would cause the elastic limit of the material of pins 20 to be exceeded so that the desired compressive force is applied to the core 10 by the pins.

Referring now to Fig. 3, in which like reference numerals refer to the same parts as in Fig. 1, there is shown a modified form of my invention in which pins 20 are initially of a semicircular cross section to eliminate the necessity for a grinding operation after the pins are welded to the end rings 18. In this modified form, it is preferable that the flat surface of each pin 20 be positioned below the peripheral surface of the core 10, as shown at 21, so that they do not interfere with the insertion of the core into the usual shell (not shown).

It is apparent that the particular shape of the pins and of the grooves in the laminations is not essential to the practice of this invention in its broadest aspects. While the groove 16 of each lamination 12 interlocks with the pins 20 to prevent relative moment of one lamination 12 with respect to another, it is apparent that the laminations need not be provided with grooves if the compressive force exerted by the pins 20 is sufficient to prevent such relative movement between the laminations, and the outer periphery of the core 10 does not need to be finished by grinding operation. Moreover, while the precise number of pins 20 utilized in any given construction employing the teachings of this invention is not critical, it is desirable that a relatively large number of pins be utilized to distribute the compressive force exerted by the pins uniformly throughout the laminated core.

From the foregoing, it will be readily apparent to one skilled in the art that, while particular forms of this invention are illustrated, further modifications and advantages employing the same inventive concept are contemplated and this invention is limited only by the claims which follow.

What I claim as new and desire to secure by Letters Patent of the United States is:

1. In combination, a lamination stack having a plurality of laminations laid contiguously face to face, clamping rings positioned at each end of said punchings, and a plurality of pins connecting said clamping rings, said pins being stretched beyond their elastic limits and having a permanent elongation thereby to apply a controlled compressive force on said laminations.

2. A magnetic core comprising a plurality of laminations laid contiguously face to face, a plurality of pins connected only to the ends of said core, said pins being tensioned beyond their elastic limits and having a permanent elongation to exert a substantially uniform predetermined force for holding said laminations together.

3. A magnetic core comprising a plurality of stacked laminations, a pair of end rings positioned at each end of said laminations, the surface of said stacked laminations and said end rings being provided with aligned grooves, a plurality of pins positioned in said grooves and secured to said end rings, said pins being tensioned beyond their elastic limits and having a permanent elongation to apply a predetermined compressive force on said laminations for holding said laminations together.

4. The method of making a magnetic core comprising placing a stack of laminations between a pair of end rings, applying an external clamping force of a predetermined amount to the end rings, connecting said end rings by a plurality of pins, and releasing the clamping force to stretch said pins beyond their elastic limits to produce a permanent elongation therein whereby said pins apply a substantially uniform compressive force on said laminations.

5. The method described in claim 4 wherein a cross sectional portion of the pins is removed after the welding operation.

6. The method of making a magnetic core comprising the placing of a plurality of laminations laid contiguously face to face between a pair of end rings, connecting said end rings by a plurality of clamping pins, and tensioning said pins beyond their elastic limits to produce a permanent elongation therein thereby to apply a controlled compressive force on said laminations for holding said laminations together.

References Cited in the file of this patent

UNITED STATES PATENTS

| | | |
|---|---|---|
| 1,150,049 | Martin | Aug. 17, 1915 |
| 1,654,306 | Paszkowski | Dec. 27, 1927 |
| 2,653,208 | Ballman | Sept. 22, 1953 |